US012488240B2

(12) United States Patent
Hakkani-Tur et al.

(10) Patent No.: US 12,488,240 B2
(45) Date of Patent: *Dec. 2, 2025

(54) MULTI-DOMAIN JOINT SEMANTIC FRAME PARSING

(71) Applicant: Microsoft Technology Licensing, LLC, Redmond, WA (US)

(72) Inventors: Dilek Z Hakkani-Tur, Kirkland, WA (US); Asli Celikyilmaz, Kirkland, WA (US); Yun-Nung Chen, Taipei (TW); Li Deng, Redmond, WA (US); Jianfeng Gao, Woodinville, WA (US); Gokhan Tur, Kirkland, WA (US); Ye Yi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,708

(22) Filed: Aug. 29, 2023

(65) Prior Publication Data

US 2023/0401445 A1   Dec. 14, 2023

Related U.S. Application Data

(63) Continuation of application No. 15/228,990, filed on Aug. 4, 2016, now Pat. No. 11,783,173.

(Continued)

(51) Int. Cl.
 *G06N 3/08* (2023.01)
 *G06N 3/044* (2023.01)
(Continued)

(52) U.S. Cl.
 CPC .............. *G06N 3/08* (2013.01); *G06N 3/044* (2023.01); *G10L 15/16* (2013.01); *G10L 15/1822* (2013.01); *G10L 15/22* (2013.01)

(58) Field of Classification Search
 CPC ...... G06N 3/08; G06N 3/0445; G06N 3/0454; G06N 3/02; G10L 15/22; G10L 15/16; G10L 15/1822
 See application file for complete search history.

(56) References Cited

U.S. PATENT DOCUMENTS 10,489,393 B1 * 11/2019 Mittal ................. G06F 16/2455
2012/0166178 A1 * 6/2012 Latzina ................. G06F 40/237
  704/9

(Continued)

OTHER PUBLICATIONS

Mesnil et al. "Using Recurrent Neural Networks for Slot Filling in Spoken Language Understanding", IEEE/ACM transactions on audio, speech, and language processing, vol. 23, No. 3, Mar. 2015 (Year: 2015).*

(Continued)

*Primary Examiner* — Imad Kassim
(74) *Attorney, Agent, or Firm* — Schwegman Lundberg & Woessner, P.A.

(57) ABSTRACT

A processing unit can train a model as a joint multi-domain recurrent neural network (JRNN), such as a bi-directional recurrent neural network (bRNN) and/or a recurrent neural network with long-short term memory (RNN-LSTM) for spoken language understanding (SLU). The processing unit can use the trained model to, e.g., jointly model slot filling, intent determination, and domain classification. The joint multi-domain model described herein can estimate a complete semantic frame per query, and the joint multi-domain model enables multi-task deep learning leveraging the data from multiple domains. The joint multi-domain recurrent neural (JRNN) can leverage semantic intents (such as, finding or identifying, e.g., a domain specific goal) and slots (such as, dates, times, locations, subjects, etc.) across multiple domains.

20 Claims, 6 Drawing Sheets

Related U.S. Application Data

(60) Provisional application No. 62/354,064, filed on Jun. 23, 2016.

(51) Int. Cl.
  G10L 15/16 (2006.01)
  G10L 15/18 (2013.01)
  G10L 15/22 (2006.01)

(56) References Cited

U.S. PATENT DOCUMENTS

| | | | | |
|---|---|---|---|---|
| 2015/0066496 A1* | 3/2015 | Deoras | G10L 15/16 | 704/232 |
| 2015/0161521 A1* | 6/2015 | Shah | G06F 3/0481 | 715/705 |

OTHER PUBLICATIONS

Ravuri et al. ("Recurrent Neural Network and LSTM Models for Lexical Utterance Classification", Interspeech 2015) (Year: 2015).*

Shi et al. ("Contextual Spoken Language Understanding Using Recurrent Neural Networks") (Year: 2015).*

Sutskever et al ("Sequence to Sequence Learning with Neural Networks", Part of Advances in Neural Information Processing Systems 27 (NIPS 2014)) (Year: 2014).*

Guo et al. ("Joint Semantic Utterance Classification and Slot Filling With Recursive Neural Networks", 2014, Microsoft research) (Year: 2014).*

* cited by examiner

| X | FIND | RECENT | COMEDIES | BY | JAMES | CAMERON | EOS |
|---|---|---|---|---|---|---|---|
| W | $W_1$ | $W_2$ | $W_3$ | $W_4$ | $W_5$ | $W_6$ | |
| S | O | B-date | B-genre | O | B-dir | I-dir | O |
| D | movies | | | | | | |
| I | find_movie | | | | | | |

DOMAIN: movies
INTENT: find movie
DATE: recent  [time frame identified with further processing]
GENRE: comedy
DIRECTOR: james cameron

MULTI-DOMAIN JOINT SEMANTIC FRAME PARSING

CLAIM OF PRIORITY

This application is a continuation of U.S. application Ser. No. 15/228,990, filed Aug. 4, 2016, and claims priority to U.S. Provisional Application No. 62/354,064, filed Jun. 23, 2016, which applications are incorporated herein by reference in their entireties.

BACKGROUND

Previously sequence-to-sequence deep learning has been explored for building single domain models for individual tasks in spoken language understanding (SLU) research i.e., for the slot filling task, the domain classification task, or the task of determining intent. Typically these three tasks are performed separately for conversation understanding systems like digital personal assistants. These three individual tasks each contribute certain information to form a semantic frame in an effort to capture the semantics of user queries or utterances. Conventionally, domain classification is completed first in SLU systems. In this way, domain classification serves as a top-level triage for subsequent processing. Intent determination and slot filling are then each run for each domain to complete a domain specific semantic frame template.

For example, the conventional modular design approach (i.e., modeling SLU as three individual tasks) has several disadvantages: First multiple models must be trained for each domain. Fragmentation is necessary, and much of the process is manual with repeated fine tuning of parameters which is an error-prone process, requiring careful engineering to have some consistency in processing across domains. Also, during run-time, traditional pipelining of tasks results in transfer of errors from one task to the following tasks, which results in low-quality results. Furthermore, in the conventional modular design approach there is no data or feature sharing between individual domain models, which results in data fragmentation significantly hampering scalability. In addition, users often do not know which domains are covered by the system or to what extent certain domains are covered, which in the conventional modular design approach results in user interactions in which the users do not know what to expect. Thus, the conventional modular design approach often results in user dissatisfaction.

Improvement in accuracy and processing speed for SLU is important for conversation understanding systems like digital personal assistants.

SUMMARY

This disclosure describes systems, methods, and computer-executable instructions on computer-readable media for training a model as a joint multi-domain recurrent neural network (JRNN), such as a bi-directional recurrent neural network (bRNN) and/or a recurrent neural network with long-short term memory (RNN-LSTM) for spoken language understanding (SLU), and for using the trained model to, e.g., jointly model slot filling, intent determination, and domain classification. The joint multi-domain model described herein can estimate a complete semantic frame per query, and the joint multi-domain model enables multi-task deep learning where the data from multiple domains reinforce each other.

In various examples, a computing device operates a joint multi-domain recurrent neural network (JRNN) leveraging semantic intents (such as, finding or identifying, e.g., a domain specific goal) and slots (such as, dates, times, locations, subjects, etc.) across multiple domains.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIG. 4A depicts an example architecture of a long short term memory (LSTM) that can be used in neural networks according to various examples described herein.

FIG. 4B depicts an example architecture of a long short term memory—look around (LSTM-LA) that can be used in neural networks according to various examples described herein.

FIG. 4C depicts an example architecture of a bi-directional long short term memory—look around (bLSTM-LA) that can be used in neural networks according to various examples described herein.

DETAILED DESCRIPTION

Overview

Examples described herein provide techniques and constructs to improve the training and operation of computational models, e.g., recurrent neural networks (RNNs). In the last decade, a variety of practical, goal-oriented conversation understanding systems have been built for a number of domains, such as the virtual personal assistants Microsoft Cortana, Apple Siri, Google Now, Amazon Echo/Alexa, etc.

A single recurrent neural network (RNN) architecture can integrate the three tasks of domain detection, intent detection, and slot filling for multiple domains in a single SLU model. In examples the single RNN architecture can train the single SLU model using a plurality of available utterances from a plurality of domains paired with respective semantic frames. In examples the single RNN architecture can train the single SLU model using all available utterances from a plurality of domains paired with respective semantic frames. In examples the single RNN architecture can train the single SLU model using a plurality of available utterances from all domains paired with respective semantic frames. In at least one example the single RNN architecture can train the single SLU model using all the available utterances from all the domains, paired with their semantic frames. Examples herein illustrate results using the publicly available ATIS data set, and alarm, calendar, communication, and technical domains. Additional domains, though not illustrated may be added, e.g., sports, to extend the model for scalability of multi-domain joint semantic frame parsing as described herein.

Figures 3, 4A:
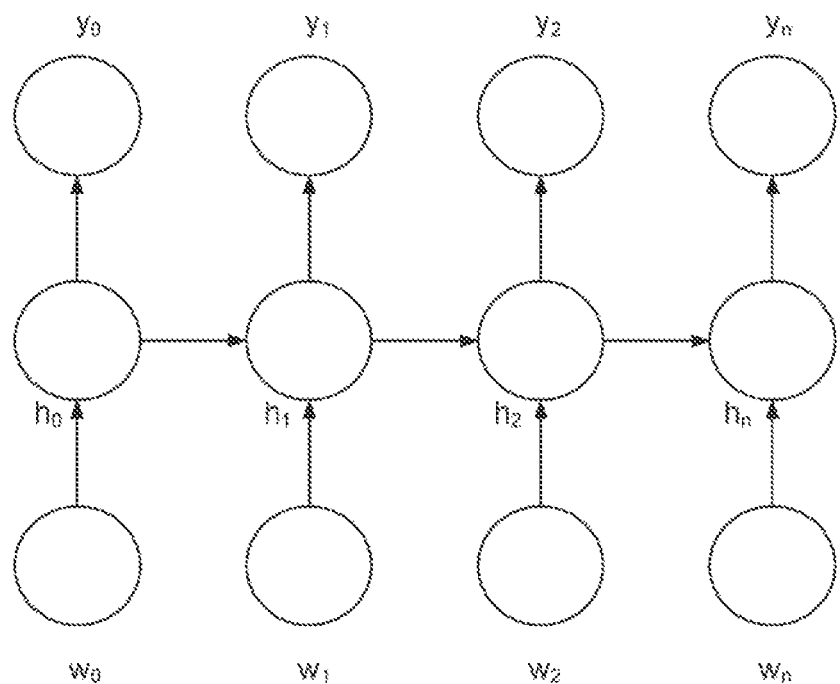
FIG. 3 is an example semantic frame for a movie-related user utterance, 'find recent comedies by James Cameron," to model interactions during training and operation of a computational model for multi-domain joint semantic frame parsing according to various examples described herein.
FIGS. 4A, 4B, and 4C are dataflow diagrams depicting example architectures that can be used in neural networks according to various examples described herein.

The input of such RNNs can be the input sequence of words (e.g., user queries and verbal utterances) and the output in the form of a full semantic frame, including domain, intent, and slots, as shown in FIG. 3. Dependency between words in a query can be important for SLU tasks, and dependency between words in a query can be treated differently by alternative architectures for integrating lexical context and dependencies. In some examples, an input, e.g., a user utterance, can contain more than one domain and intent (such as, I want to find a flight to London and reserve a hotel there). The single model approach described herein compares favorably to alternative ways of building models for multi-task, multi-domain scenarios. For example, the conventional modular design approach (i.e., modeling SLU as 3 individual tasks) has several disadvantages: First models must be trained for each domain, which is an error-prone process, requiring careful engineering to insure consistency in processing across domains. Also, during run-time, traditional pipelining of tasks results in transfer of errors from one task to the following tasks. Furthermore, in the conventional modular design approach there is no data or feature sharing between individual domain models, which results in data fragmentation, whereas, some semantic intents (such as, finding or buying, e.g., a domain specific goal) and slots (such as, dates, times, locations, subjects, etc.) are often actually common to multiple domains. In addition, users often do not know which domains are covered by the system or to what extent certain domains are covered, which in the conventional modular design approach results in user interactions in which the users do not know what to expect. Thus, the conventional modular design approach results in user dissatisfaction.

A baseline RNN-LSTM architecture can be based on the slot filling task, and can explore various architectures for exploiting lexical context. Alternate RNN architectures can be used including gated recurrent units (RNN-GRU). Examples described herein extend the RNN-LSTM architecture for the slot filling task to model domain and intent of user utterances in addition to slot filling as a multi-domain multi-task architecture for SLU. Experiments investigated the performance of alternative architectures on the publicly available ATIS data set, and on Microsoft Cortana multi-domain data as examples. Compared to previous approaches, a single multi-domain, joint model approach as described herein is simpler, and results in the best F-measure in the experimental results.

As used herein, F-measure represents a combined measure of precision and recall, e.g., an average of scores precision and recall. As used herein, semantic parsing represents parsing of an input, be it a verbal utterance or other form of query, to identify parts and/or characteristics of the input. Semantic parsing can include identifying domain and intent of the input, and assigning words of the input to slots, though other terminologies are may be included in semantic parsing as described herein including domain, dialogue, constraint slot, and requested slot, combination of action and requested slot, and equivalents thereof. As used herein domain represents a category identified for an input from semantic parsing. As used herein intent represents the goal of an input for semantic parsing. As defined herein slot represents a constraint for a query or argument for an API for semantic parsing.

As used herein query means an input to multi-domain joint task semantic frame parsing and utterance means a particular type of sound-based query input.

As used herein domain classification represents a task of identifying a category of input for semantic parsing, intent classification represents a task of determining an intent of an input for semantic parsing, and slot filling represents assigning constraints for a query or arguments for an API for semantic parsing without limitation for a minimum or maximum number of slots, including zero slots. In the instance of zero slots in a query, location of the device from which the query is received can be treated an inferred location slot.

The innovation described herein experimented with a combination of four domains: alarm, calendar, communication, and technical. The same algorithm is extensible for building and training the model with additional domains. While it is expected that identifying how to create a data set from additional domains may employ different algorithms for additional domains.

Some examples use distributed computing resources and/or processing units provisioned as part of a cluster computing system ("computing cluster" or "cluster") having several discrete computing nodes that work together to accomplish a computing task assigned to the cluster as a whole. Some such systems can have all or a portion of the cluster deployed in a distributed manner, aka in the cloud. Distributed or cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

In various examples, e.g., of computational models trained for multi-domain joint semantic frame parsing and/or other use cases noted herein, the computational models may include artificial neurons, e.g., as found in multilayer perceptrons and/or other neural networks. A neural network can have none, one or more (such as stacked architectures), or at least two hidden layers. The techniques described herein may include the use of an algorithm to parallelize the training of the RNNs across multiple processing units, e.g., cores of a multi-core processor and/or multiple general-purpose graphics processing units (GPGPUs). Accordingly, multiple layers of RNNs may be processed in parallel on the multiple processing units. Neural networks such as RNNs can be trained with minibatch-based stochastic gradient descent (SGD). Other frameworks besides SGD can be used, e.g., minibatch non-stochastic gradient descent and/or other mathematical-optimization techniques.

In some examples, an RNN can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back as additional input to the memory cells. In some examples, an RNN can include one or more long short-term memory (LSTM) units, e.g., as discussed below with reference to FIG. 4.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s).

Various environments, configurations of electronic devices, and methods for training and using computational models, e.g., for control applications, are described further with reference to FIGS. 1-6. While many examples described herein relate to servers and other non-consumer electronic devices, other types of electronic devices can be used, e.g., as discussed with reference to FIG. 1.

Illustrative Environment

Figure 1:
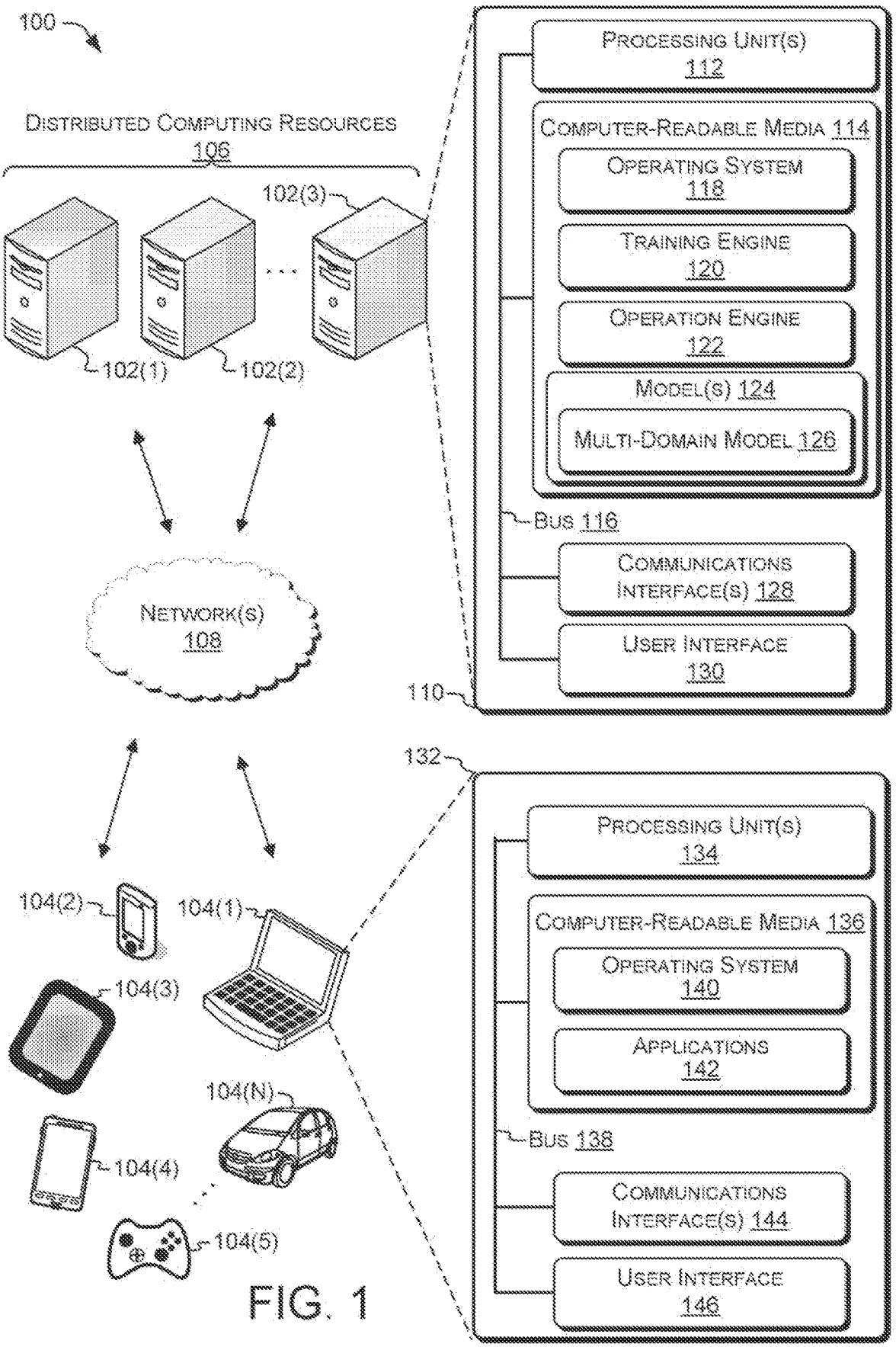
FIG. 1 is a block diagram depicting an example environment for implementing training and operation of computational models for multi-domain joint semantic frame parsing as described herein.

FIG. 1 shows an example environment 100 in which examples of computational model training systems, e.g., recurrent neural network (RNN) training systems or multi-model training systems for multi-domain joint semantic frame parsing, can operate and/or in which computational-model training for multi-domain joint semantic frame parsing and/or use methods for multi-domain joint semantic frame parsing such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, e.g., distributed computing resource(s), and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes of distributed computing resources 106, e.g., in a computing cluster, such as a cloud service such as MICROSOFT AZURE, VMware vCloud, Rackspace, Inc.'s OpenStack, Amazon Web Services AWS, IBM SmartCloud, Oracle Cloud, etc. In the illustrated example, computing device(s) 104 can be clients of distributed computing resources 106 and can submit jobs to distributed computing resources 106 and/or receive job results from distributed computing resources 106. Computing devices 102(1)-102(N) in distributed computing resources 106 can, e.g., share resources, balance load, increase performance, and/or provide fail-over support and/or redundancy. Computing devices 104 can additionally or alternatively operate in a cluster and/or grouped configuration.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers (e.g., 104(3)), tablet hybrid computers, smartphones, mobile phones, mobile phone-tablet hybrid devices, and/or other telecommunication devices (e.g., 104(4)), sensors and/or other devices or systems for detecting characteristics of an environment, such as thermal, optical, vibratory, pressure, weather, and/or other sensors, portable and/or console-based gaming devices and/or other entertainment devices such as network-enabled televisions, set-top boxes, media players, cameras, and/or personal video recorders (PVRs) (e.g., (e.g., 104(5)), represented graphically as a gamepad), automotive computers such as vehicle control systems, vehicle security systems, and/or electronic keys for vehicles (e.g., 104(N), represented graphically as an automobile), desktop computers, and/or integrated components for inclusion in computing devices, appliances, and/or other computing device(s) configured to participate in and/or carry out computational-model training and/or operation as described herein. In some examples, as indicated, computing device(s), e.g., computing devices 102 and 104, can intercommunicate to participate in and/or carry out computational-model training and/or operation as described herein. For example, a computing device 104 can be a query and/or data source and computing device 102 can be a computational-model training system, as described below with reference to, e.g., FIGS. 2-6.

Different devices and/or types of computing devices 102 and 104 can have different needs and/or ways of interacting with distributed computing resources 106. For example, computing devices 104 can interact with distributed computing resources distributed computing resources 106 with discrete request/response communications, e.g., for responses and/or updates using an already-trained model. Additionally and/or alternatively, computing devices 104 can be query and/or data sources and can interact with distributed computing resources distributed computing resources 106 with discrete and/or ongoing transmissions of data to be used as input to a computational model. This can provide improved accuracy by increasing the number or queries and/or amount of data input to the model. Additionally and/or alternatively, computing devices 104 can be data sinks and can interact with distributed computing resources 106 with discrete and/or ongoing requests for data output from a computational model.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks, etc. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware and/or software components. The illustrated computing device 102 can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Computer-readable media described herein, e.g., computer-readable media 114, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 102, while in some examples at least one processing unit 114, e.g., one or more of a CPU, GPU, and/or hardware logic device, can be external to computing device 102.

Computer-readable media 114 can store, for example, computer-executable instructions of an operating system 118, module(s) of a training engine 120, module(s) of an operation engine 122, and/or other modules, programs, and/or applications that are loadable and executable by processing unit(s) 112. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to operation engine 122, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system 118, the training engine 120, and/or the operation engine 122.

Computer-readable media 114 can also store, for example, one or more computational model(s) 124, individually and/or collectively referred to herein with reference 124. The computational model(s) 124 include, e.g., one or more recurrent neural networks (RNNs) such as a multi-domain model 126. Example RNNs can include long short-term memory (LSTM) units, long short-term memory look around (LSTM-LA) units, or bi-directional long short-term memory (bLSTM) units, with or without look around, as described above, and/or any combination thereof. Examples of RNNs including LSTM, LSTM-LA, and bLSTM are discussed below with reference to FIG. 4. As noted above, the computational models 124 can include, e.g., activation weights, functions, and/or thresholds (collectively "parameters") for artificial neurons and/or other computational units (e.g., LSTM units) of one or more neural networks. The training engine 120 and/or the operation engine 122 can determine values of parameters computational models 124 and can use the determined parameters values of computational model 124 to perform data analysis and/or processing.

Processing unit(s) 112 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computing device 102 can also include one or more communications interfaces 128 connected via the bus 116 to processing unit(s) 112 to enable wired and/or wireless communications between computing device(s) 102 and other networked computing devices 102 and/or 104 involved in multi-domain joint semantic frame parsing, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 114 of the computing device 102 can store an operating system 118. In some examples, an operating system 118 is not used (commonly referred to as a "bare metal" configuration). In some examples, the operating system 118 can include components that enable and/or direct the computing device 102 to receive data via various inputs (e.g., user controls, network and/or communications interfaces, memory devices, and/or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., an engineer, to interact with the computing device 102 using a user interface. Additionally, the operating system 118 can include components that perform various functions generally associated with an operating system 118, e.g., storage management and internal-device management.

In some examples, computing device 102 can include a user interface 130 configured to permit a user, e.g., an engineer responsible for computing device 102(3), distributed computing resources 106, environment 100 and/or a neural-network administrator, to operate the training engine 120, the operation engine 122, and/or the model(s) 124 including the multi-domain model 126. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more computer storage media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Some examples of operating system 140 are discussed above with reference to inset 110.

In some examples, the computing device 104 can be configured to communicate with distributed computing resources 106 and/or computing device(s) 102 to operate a multi-domain model 126 and/or other computational model 124. For example, the computing device 104 can transmit a request to distributed computing resources 106 and/or computing device(s) 102 for an output of the multi-domain model 126 and/or other computational model(s) 124, receive a response, and take action based on that response. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate a hidden layer of one or more neural network(s).

Computing device 104 can also include one or more communications interfaces 144 connected via the bus 138 to processing unit(s) 134 to enable wired and/or wireless communications between computing device(s) 104 distributed computing resources 106 and/or and other networked computing devices 102 and/or 104 involved in multi-domain joint semantic frame parsing, and/or other computing device(s), over network(s) 108. Some examples are discussed above with reference to communications interface(s) 128.

In some examples, computing device 104 can include a user interface 146. For example, computing device 104(4) can provide user interface 146 to control and/or otherwise interact with distributed computing resources 106 and/or computing devices 102. For example, processing unit(s) 134 can receive inputs of user actions via user interface 146 and transmit corresponding data via communications interface(s) 144 to computing device(s) 102.

User interface 130 and/or 146 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User interfaces 130 and/or 146 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Illustrative Components

Figure 2:
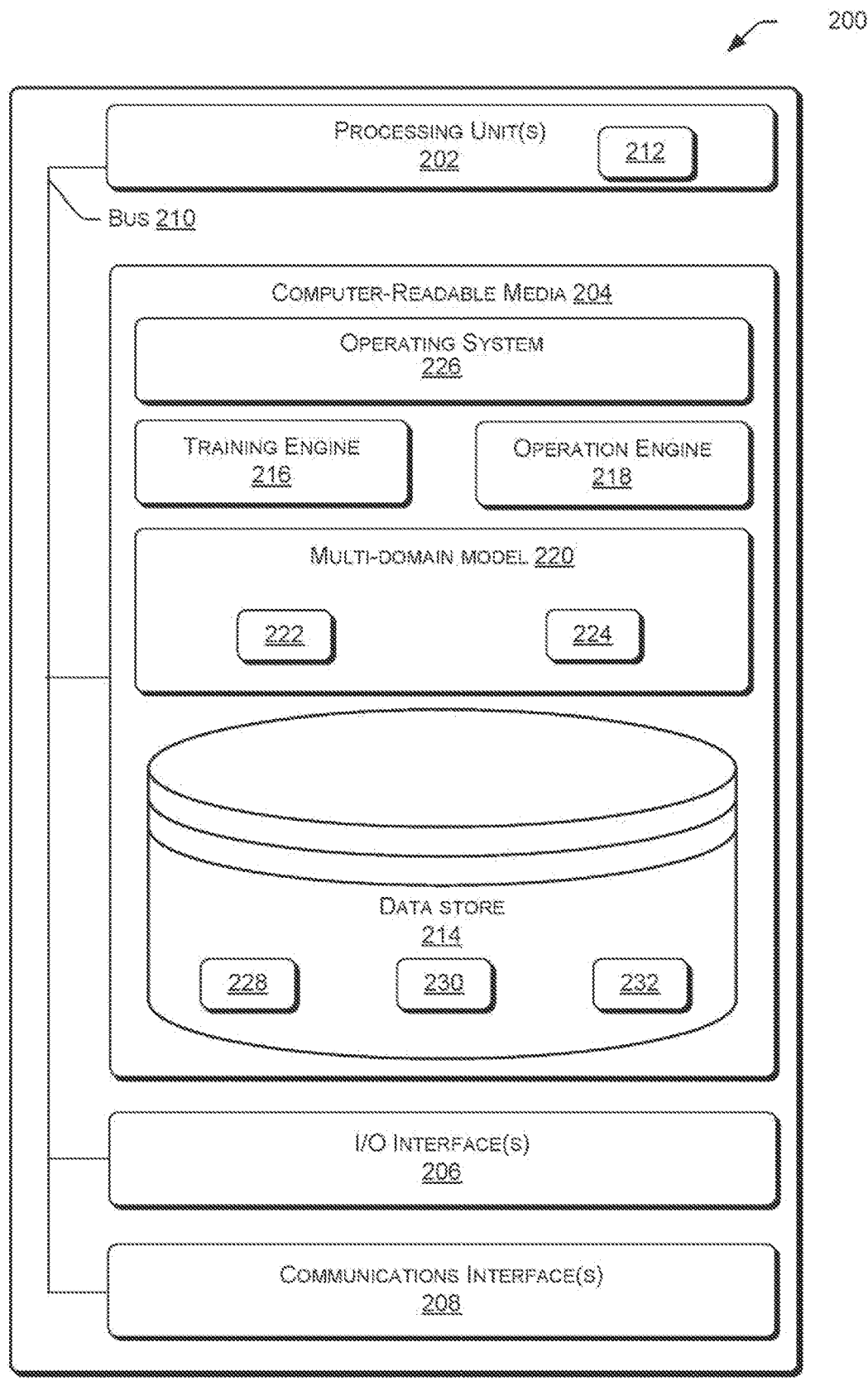
FIG. 2 is a block diagram depicting an example computing device configured to participate in training and operation of computational models for multi-domain joint semantic frame parsing according to various examples described herein.

FIG. 2 is an illustrative diagram that shows example components of a computing device 200, which can represent computing device(s) 102 and/or 104, and which can be and/or implement an RNN training and/or operation system, device, and/or apparatus, according to various examples described herein. Example computing device 200 includes one or more processing unit(s) 202, computer-readable media 204, input/output interface(s) 206, and network interface(s) 208. The components of computing device 200 are operatively connected, for example, via a bus 210. These components can represent corresponding components from device(s) 102 a, e.g., processing unit(s) 202 can represent processing unit(s) 112, bus 210 can represent bus 116, etc.

In example computing device 200, processing unit(s) 202 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include and/or be connected to a memory 212, e.g., a RAM and/or cache.

Computer-readable media 204 may correspond to computer-readable media 124, and can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 200, while in some examples one or more of a CPU, GPU, and/or accelerator is external to computing device 200.

Computer-readable media 204 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 208, which can represent communications interface(s) 128, can represent, for example, network interface controllers (NICs) or other types of transceiver devices to send and receive communications over a network.

In the illustrated example, computer-readable media 204 includes a data store 214. In some examples, data store 214 includes data storage such as a database, data warehouse, or other type of structured or unstructured data storage. In some examples, data store 214 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 214 can store data for the operations of processes, applications, components, and/or modules stored in computer-readable media 204 and/or executed by processing unit(s) 202 and/or accelerator(s).

Computing device 200 can implement a training engine 216, which generally performs training offline and can represent training engine 120, FIG. 1. Computing device 200 can implement an operation engine 218, which generally operates online and can represent operation engine 122, FIG. 1. Computing device 200 can implement a multi-domain model 220, which is generally updated incrementally and can represent multi-domain model 126, FIG. 1. Computing device 200 can include and/or be included in a system and/or device for training and/or operating a neural network and/or other computational model as described herein.

In some examples, computer-readable media 204 of the computing device 200 can represent computer-readable media 114, FIG. 1, and can store a plurality of modules of the training engine 216, the operation engine 218, and/or the multi-domain model 220. In various examples, the multi-domain model 220 can be configured to have embeddings 222 and/or context 224 as part of the model based on updates of the multi-domain model 220. Processing unit(s) 202 can be configured to execute modules of the plurality of modules. For example, the computer-executable instructions stored on the computer-readable media 204 can upon execution configure a computer such as a computing device 200 to perform operations described herein with reference to the modules of the plurality of modules. The modules stored in the computer-readable media 204 can include instructions that, when executed by the one or more processing units 202, cause the one or more processing units 202 to perform operations described below. Examples of modules in computer-readable media 204 are discussed below. Computer-readable media 204 can also include an operating system 226, which can represent operating system 118, e.g., as discussed above. Computer-readable media 204 can be computer storage media, as discussed above.

In the illustrated example, computer-readable media 204 includes a data store 214. In some examples, data store 214 can include data storage, structured and/or unstructured, such as a database (e.g., a Structured Query Language, SQL, and/or NoSQL database) and/or data warehouse. In some examples, data store 214 can include a corpus and/or a relational database with one or more tables, arrays, indices, stored procedures, and so forth to enable data access. Data store 214 can store data for the operations of processes, applications, components, and/or modules stored in computer-readable media 204 and/or computer instructions in those modules executed by processing unit(s) 202. In some examples, the data store can store computer program instructions 228 (e.g., instructions corresponding to processes described herein and/or to other software executable by processing unit(s) 202), one or more computational models 230, which can represent computational models 126, FIG. 1, training data 232, e.g., datasets, to be used for training and/or operation of the computational models 230, metadata, e.g., of data domains (discussed below), database schema(s), and/or any combination thereof.

Computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, sensors, data aggregators, and/or data feeds, e.g., via application programming interfaces (APIs). The processing units 202 can retrieve data from the data source(s), e.g., via an HTTP request such as a GET to a Web Services and/or Representational State Transfer (REST) API endpoint.

In some examples, the processing unit(s) 202 can access the module(s) on the computer-readable media 204 via bus 210, which can represent bus 116, FIG. 1. I/O interface 206 and communications interface 208 can also communicate with processing unit(s) 202 via bus 210.

The modules of the training engine 216 stored on computer-readable media 204 can include one or more modules, e.g., shell modules and/or API modules, for training RNN, LSTM, LSTM-LA, and/or bLSTM.

The modules of the operation engine 218 stored on computer-readable media 204 can include one or more modules, e.g., shell modules and/or API modules, for operating RNN, LSTM, LSTM-LA, and/or bLSTM.

In the training engine 216 and/or the operation engine 218, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs.

FIG. 3 is an example semantic frame for a movie-related query, e.g., an utterance, "find recent comedies by James Cameron," to model interactions during training and operation of a computational model for multi-domain joint semantic frame parsing according to various examples described herein.

A major SLU task in goal-oriented human-machine conversational understanding systems is to automatically classify the domain of a user query along with domain specific intents and fill in a set of arguments or "slots" to form a semantic frame. FIG. 3 illustrates the popular in-out-begin (IOB) format for representing the slot tags. IOB is one way of assigning tags to words so the system can accomplish the task of slot filling. Given a sequence of words, try to find corresponding sequence of tags for slot filling.

In the previous, modular design approach, (i.e., modeling SLU as 3 tasks) specific modifications (e.g., insertions, deletions) to a domain can be implemented without requiring changes to other domains. The modular design approach can use task/domain specific features, which often improves the accuracy of these task/domain specific models. Also, the modular design approach yields more focused understanding in each domain since the intent determination just considers a relatively small set of intent and slot classes over a single (or limited set) of domains, and model parameters could be optimized for the specific set of intent and slots. However, the modular design approach has several disadvantages: first multiple models must be trained for each domain. Fragmentation is necessary, and much of the process is manual with repeated fine tuning of parameters which is an error-prone process, requiring careful engineering to have some consistency in processing across domains. Also, during run-time, traditional pipelining of tasks results in transfer of errors from one task to the following tasks, which results in low-quality results. Furthermore, in the conventional modular design approach there is no data or feature sharing between individual domain models, which results in data fragmentation significantly hampering scalability. In addition, the modular design approach is memory and processing time intensive, even using the fastest algorithms conditional random field (CRF) or support vector machine (SVM). Each of the domain, intent, and slot-filling models uses memory, performs feature extraction, imposes run-time requirements. Using CRF or SVM, each model can take one millisecond, multiplied by all of the domains three times.

RNN approaches as described herein, represent each word with a vector representation. The vector could be a one-hot vector. In some examples, a pre-trained vector-space embedding for the word, can be used. Moreover, context can be inferred from output words directly before begin words in the IOB format. In the example of FIG. 3, replacing "by" with "with" would change the context for "James Cameron" to actor rather than director. In contrast to the previous, modular design approach, the multi-domain joint semantic frame parsing model described herein demonstrates a performance improvement in that it can run in two milliseconds.

To estimate the sequence of tags $Y=y_1, \ldots, y_n$ corresponding to an input sequence of tokens $X=x_1, \ldots, x_n$, operation engine 218 uses the Elman RNN architecture, made up of an input layer, a hidden layer (for the single layer version), and an output layer. The input, hidden and output layers consist of a set of neurons representing the input, hidden, and output at each time step t, $x_t$; $h_t$, and $y_t$, respectively. The input is typically represented by 1-hot vector or word level embeddings. Given the input layer $x_t$ at time t, and hidden state from the previous time step $h_{t-1}$, the hidden and output layers for the current time step are computed as follows in Equation 1:

$$h_t = a\left(W_{xh}\begin{bmatrix} h_{t-1} \\ x_t \end{bmatrix}\right) \quad (1)$$

$$p_t = \text{softmax}(W_{hy}h_t)$$

$$\hat{y}_t = \text{argmax } p_t$$

where $W_{xh}$ and $W_{hy}$ are the matrices that denote the weights between the input and hidden layers and hidden and output layers, respectively. a( ) denotes the activation function, i.e., tan h or sigm. The softmax is defined by Equation 2:

$$\text{softmax}(z_m) = \frac{e^{z_m}}{\sum_i e^{z_i}} \quad (2)$$

In various examples, training engine 216 trains weights of the model using backpropagation to maximize the conditional likelihood of the training set labels according to Equation 3:

$$\prod_t p(y_t | x_1, \ldots, x_t) \quad (3)$$

Training model parameters with backpropagation over time could result in exploding or vanishing gradients. While exploding gradients can be alleviated by gradient clipping; gradient clipping does not solve vanishing gradients. LSTM cells can mitigate the vanishing gradient problem. In addition to the hidden layer vector $h_t$, LSTMs maintain a memory vector, $c_t$, which can be read from, written to, and/or reset using a gating mechanism and sigmoid functions. The input gate, it can be used to scale down the input; the forget gate, $f_t$ can be used to scale down the memory vector $c_t$; the output gate, and/or $o_t$ can be used to scale down the output to reach the final $h_t$. Applying this formulation, these gates in LSTMs can be computed as follows in Equation 4:

$$\begin{bmatrix} i_t \\ f_t \\ o_t \\ g_t \end{bmatrix} = \begin{pmatrix} sigm \\ sigm \\ sigm \\ \tanh \end{pmatrix} W_t \begin{bmatrix} x_t \\ h_{t-1} \end{bmatrix} \quad (4)$$

where the sigm sand tan h are applied element-wise, $W_t$ is the weight matrix, and the following denoted as Equation 5:

$$c_t = f_t \odot c_{t-1} + i_t \odot g_t$$

$$h_t = o \odot \tan h(c_t). \quad (5)$$

Figure 4B:
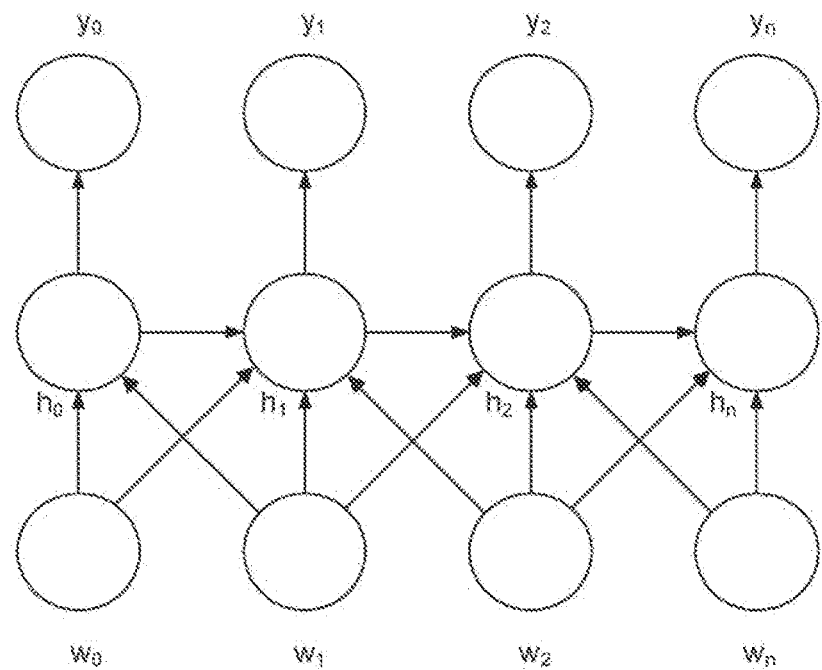
Figure 4C:
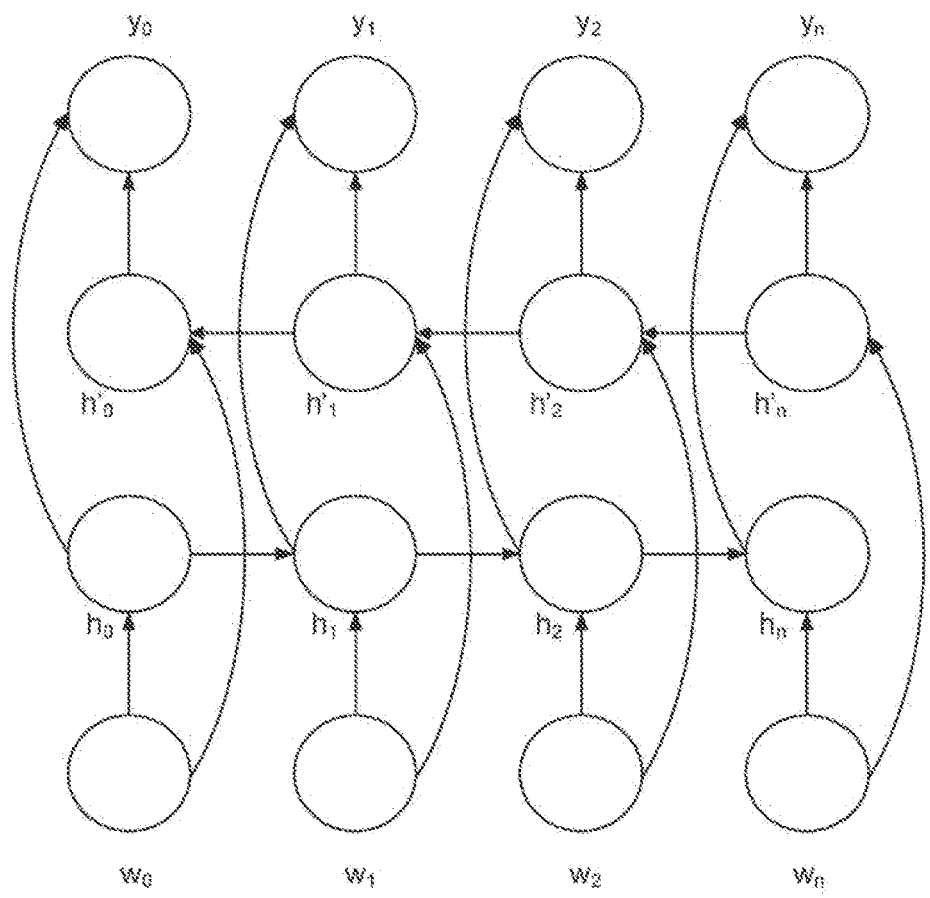

FIGS. 4A, 4B, and 4C are dataflow diagrams depicting example architectures that can be used in neural networks according to various examples described herein. In SLU, word tags are determined based on associated terms and context. For example, in ATIS data, the city name Boston could be tagged as originating or destination city, according to the lexical context in which it appears. Example of architectures for capturing such dependencies as described herein include RNN-LSTM as shown in FIG. 4A and two extensions, look-around LSTM (LSTM-LA) as shown in FIG. 4B and bi-directional LSTM (bLSTM) as shown in FIG. 4C.

At each time step, in addition to $x_t$, LSTM-LA (FIG. 4B) operation engine 218 considers the following and preceding words as part of the input, by concatenating the input vectors for the neighboring words. Input at time t is a single vector formed by concatenating $x_{t-1}$; $x_t$; $x_{t+1}$.

In bLSTM (FIG. 4C), operation engine 218 traverses two LSTM architectures in a left-to-right and right-to-left manner. The operation engine concatenates the hidden layers when computing the output sequence. In Equation 6 superscripts b and f denote parameters for the backward and forward directions:

$$p_t = \text{softmax}(W_{hy}^f h_t^f + W_{hy}^b h_t^b) \quad (6)$$

The forward and backward gates of Equation 6 are computed respectively as follows in Equations 7 and 8:

$$\begin{bmatrix} i_t^f \\ f_t^f \\ o_t^f \\ g_t^f \end{bmatrix} = \begin{pmatrix} sigm \\ sigm \\ sigm \\ \tanh \end{pmatrix} W_t^f \begin{bmatrix} x_t \\ h_{t-1}^f \end{bmatrix} \quad (7)$$

$$\begin{bmatrix} i_t^b \\ f_t^b \\ o_t^b \\ g_t^b \end{bmatrix} = \begin{pmatrix} sigm \\ sigm \\ sigm \\ \tanh \end{pmatrix} W_t^b \begin{bmatrix} x_t \\ h_{t-1}^b \end{bmatrix} \quad (8)$$

Performing many of the shared computations once such as input vector preparation or top level gradient computation, $p_t$–$truth_t$, where $truth_t$ is the 1-hot vector for the target tag can make implementation more efficient.

FIG. 3 illustrates representing slot tags for slot filling by associating each input word $w_t$ of an utterance k "find recent comedies by James Cameron" with an IOB-style tag as exemplified in FIG. 3, hence the input sequence X is $w_1 \ldots w_n$ and the output is the sequence of slot tags $s_1 \ldots s_n$ associating a slot tag with each word.

For joint modeling of domain, intent, and slots, operation engine 218 assumes an additional token at the end of each input utterance k, <EOS>, and associates a combination of domain and intent tags, $d_k$ and $i_k$, to the additional token by concatenating the domain and intent tags. Hence, the new input and output sequence can be represented by Equation 9:

$$X = w_1, \ldots, w_n, <EOS>$$

$$Y = s_1, \ldots, s_n, d_k - i_k \quad (9)$$

In some examples, operation engine 218 assumes an additional token at the beginning of each input utterance k, <BOS>, which can be useful to distinguish the beginning of an utterance or beginning of a new utterance, such as when input is from more than one person speaking. The last hidden layer of the query is expected to contain a latent semantic representation of an entire input query, e.g., utterance from a single speaker.

In experiments described herein, for training the architectures, the multi-domain joint semantic frame parsing system used mini-batch stochastic gradient descent with a batch size of 10 examples and AdaGrad. Experiments were conducted with different hidden layer sizes in {50, 75, 100, 125, 150} and a fixed learning rate in {0.01, 0.05, 0.1} in the experiments. The experiments used lexical features, without using dictionaries, and represented input with 1-hot word vectors, including all the vocabulary terms. In addition to the 1-hot word vectors presented herein, experiments were conducted with word2vec and Senna embeddings. These did not produce significant performance improvement, hence only results with 1-hot vectors are presented for brevity. All parameters were uniformly initialized in [−0.01,0.01].

Experiments were conducted with the publicly available ATIS data set for air travel domain to investigate the integration of context for slot filling. For experiments related to joint domain, intent, and slot modeling, four domains: alarm, calendar, communication and technical, were employed to create a diverse set in terms of number of intents and slots. The number of training, development and test utterances, vocabulary size, number of intents and slots for each of these data sets are listed in Table 1.

TABLE 1

| Data Set | # Train | # Dev | # Test | |V| | # Intents | # Slots |
|---|---|---|---|---|---|---|
| ATIS | 4978 | — | 893 | 900 | 17 | 79 |
| Alarm | 8096 | 1057 | 846 | 433 | 16 | 8 |
| Calendar | 21,695 | 3626 | 2555 | 1832 | 20 | 18 |
| Communication | 13779 | 2662 | 1529 | 4336 | 25 | 20 |
| Technical | 7687 | 993 | 867 | 2180 | 5 | 18 |
| 4 Domains | 51,257 | 8338 | 5797 | 6680 | 59 | 42 |

Because some intents and slots are shared across different domains, the number of intents and slots in the joined data set is less than the sum of the number of intents and slots in individual domains. The lower number of intents and slots in the joined data set relative to the sum of the number of intents and slots in individual domains is shown in the last row of Table 1.

The ATIS data set comes with a commonly used training and test split. In the experiments producing the results shown, the training set was further split into 90% training and 10% development set for tuning parameters. After choosing the parameters that maximize the F-measure on the development set, the model was retrained with all of the training data with the optimum parameter set with 10 different initializations and averaged F-measures. The maximum F-measure (best F) was computed on the test set when 90% of the training examples were used and the average F-measure (avg. F) was computed by averaging F-measure from the 10 runs when all the training examples are used with the optimum parameters. These results are shown in Table 2.

TABLE 2

| Model | Best F | Average F |
|---|---|---|
| RNN | 93.06% | 92.09% |
| LSTM | 93.80% | 93.09% |
| LSTM-LA | 95.12% | 94.68% |
| bLSTM | 95.48% | 94.70% |

As shown in Table 2, the bi-directional LSTM architecture produced the best F-measure. Meanwhile, the relative performances of RNN, LSTM, and LSTM-LA were in parallel with our earlier work, though due to differences in normalization F-measure was slightly lower.

In various experiments following the slot filling experiments, operation engine 218 was configured with bi-directional LSTM for modeling slots. In some experiments operation engine 218 was configured to use LSTM for modeling intents. In some experiments operation engine 218 was configured to use LSTM for jointly modeling intent and slots.

The experiments included 4 settings, separate domain with separate models (SD-Sep), separate domain with joint model (SD-Joint), multi-domain with separate models (MD-Sep), multi-domain with joint model (MD-Joint). Reports from the experiments are provided as follows: slot F-measure (SLOT F, Table 3), intent accuracy (INTENT A, Table 4) and overall frame error rate (OVERALL E, Table 5).

SD-Sep: For each domain, a separate intent detection and slot filling model was trained, resulting in 2×|D| classifiers, where |D| represents the number of domains. In the illustrated examples, optimum parameters were found on the development set for each experiment and used for computing performance on the test set. The outputs of all the classifiers were joined for overall error rates shown in Table 5.

SD-Joint: For each domain, a single model that estimates both intent and sequence of slots was used, resulting in |D| classifiers.

MD-Sep: training engine 216 trained an intent detection model and a slot filling model using data from all the domains, resulting in 2 classifiers.

MD-Joint: training engine 216 trained a single classifier for estimating the full semantic frame that includes domain, intent, and slots for each utterance using all the data.

TABLE 3

| Slot F | SD-Sep | SD-Joint | MD-Sep | MD-Joint |
| --- | --- | --- | --- | --- |
| Alarm | 95.9% | 93.9% | 94.5% | 94.3% |
| Cal. | 94.5% | 93.7% | 92.6% | 92.4% |
| Comm. | 86.4% | 83.8% | 85.1% | 82.7% |
| Tech. | 90.4% | 89.8% | 89.6% | 88.3% |
| All | 91.8% | 90.5% | 90.0% | 89.4% |

TABLE 4

| Intent A | SD-Sep | SD-Joint | MD-Sep | MD-Joint |
| --- | --- | --- | --- | --- |
| Alarm | 96.5% | 96.2% | 94.9% | 94.3% |
| Cal. | 97.2% | 97.6% | 94.2% | 94.3% |
| Comm. | 96.1% | 95.8% | 94.0% | 95.4% |
| Tech. | 94.6% | 95.9% | 93.9% | 95.3% |
| All | 96.4% | 96.7% | 94.1% | 94.6% |

The experiments merged the output of intent detection with the output of slot filling for computing overall template error rates as shown in Table 5.

TABLE 5

| Overall E | SD-Sep | SD-Joint | MD-Sep | MD-Joint |
| --- | --- | --- | --- | --- |
| Alarm | 9.5% | 9.8% | 9.1% | 9.2% |
| Cal. | 10.7% | 11.1% | 11.3% | 10.1% |
| Comm. | 19.8% | 20.6% | 16.3% | 17.3% |
| Tech. | 20.4% | 20.6% | 21.4% | 20.2% |
| All | 14.4% | 14.9% | 13.7% | 13.4% |

SD-Sep and SD-Joint assume that the correct domain for each example in the test set is provided. To achieve such higher level domain estimation, training engine 216 trained an LSTM model for domain detection using all the data, the accuracy of the domain detection is 95.5% on the test set. Table 3 and Table 4 show results for intent detection and slot filling when the true domain is known for the first two settings, hence the performances of these two settings seem higher. However, Table 5 shows overall frame error rates when the domain estimation is integrated in the decision of the final frame. In both single-domain and multi-domain settings, intent detection accuracy improves with joint training, but slot filling degrades. Overall, multi-domain joint semantic frame parsing achieved the lowest error with the single model approach.

Illustrative Processes

Figure 5:
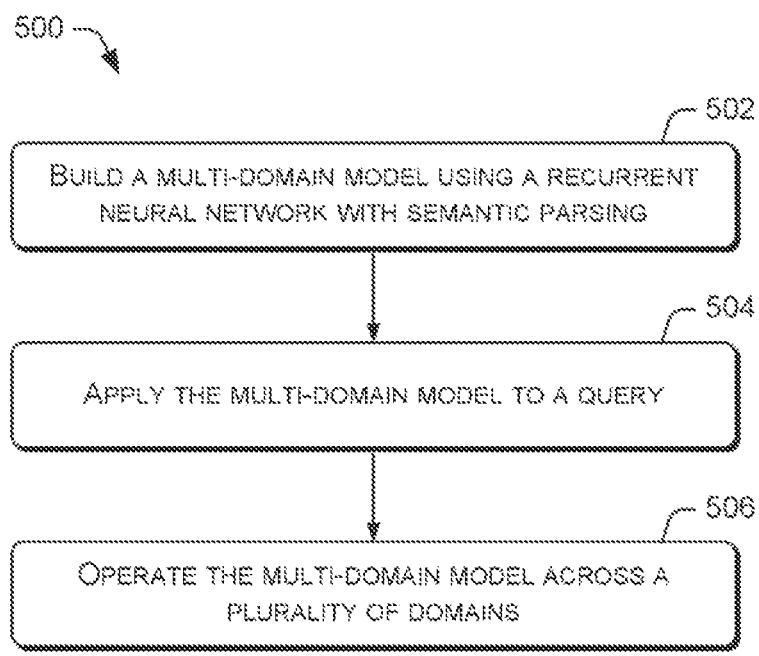
FIG. 5 is a flow diagram that illustrates example processes for operating computational models according to various examples described herein.
Figure 6:
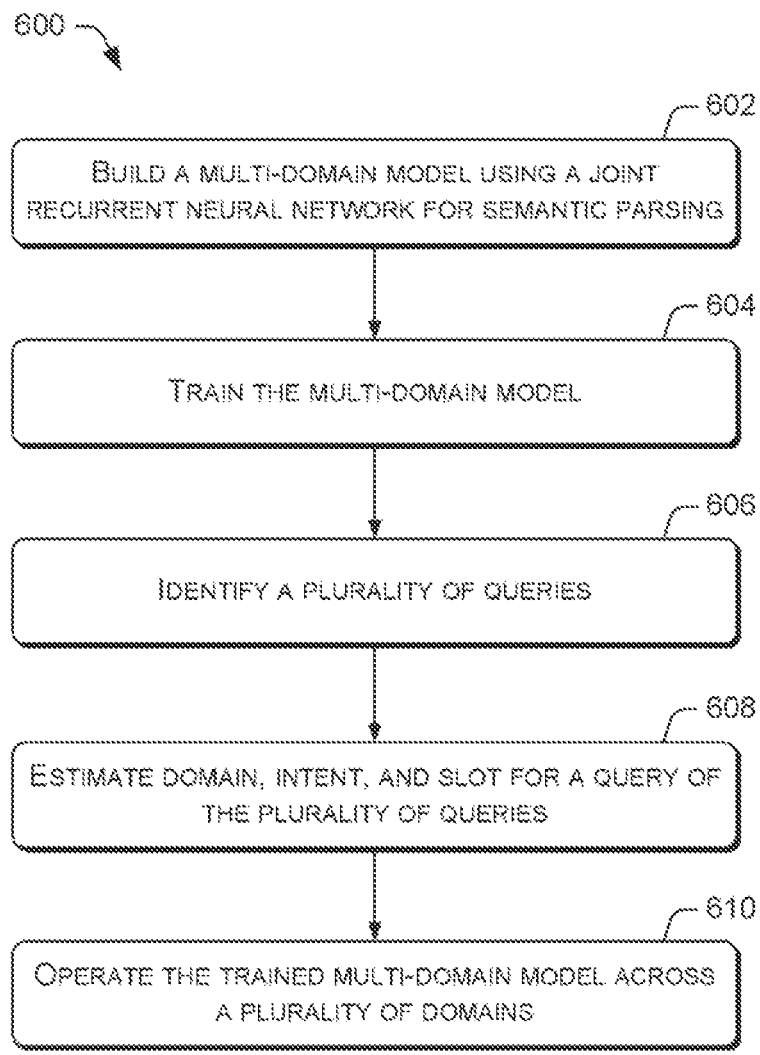
FIG. 6 is a flow diagram that illustrates example processes for training and operating computational models and selecting actions according to various examples described herein.

FIG. 5 is a flow diagram that illustrates an example process 500 for operating computational models according to various examples described herein. Example functions shown in FIG. 5 and other flow diagrams and example processes herein can be implemented by distributed computing resources 106 on and/or otherwise embodied in one or more computing device(s) 102 and/or 104, e.g., a computing device 200, e.g., using software running on such device(s). For the sake of illustration, the example process 500 is described below with reference to processing unit 202 and other components of computing device 200, FIG. 2 that can carry out and/or participate in the steps of the exemplary method. However, other processing unit(s) such as processing unit 112 and/or other components of computing device(s) 102 and/or 104 can carry out step(s) of described example processes such as process 500. Similarly, example method(s) shown in FIGS. 5 and 6 are also not limited to being carried out by any specifically-identified components.

The order in which the operations are described in each example flow diagram and/or process is not intended to be construed as a limitation, and any number of the described operations can be combined in any order and/or in parallel to implement each process. Moreover, the operations in each of FIGS. 5 and 6 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 502, a system as described herein can use a recurrent neural network (RNN) to build a multi-domain model. For example, processor 202 can execute training engine 216 offline and/or operation engine 218 online for queries in order to build a multi-domain model 220, which can be applied to later received input.

In some examples, at block 504, a system as described herein can apply the multi-domain model 220 to a query. For example, processor 202 can execute operation engine 218 to apply multi-domain model 220 to a query in order to identify a domain, determine an intent, and assign the words of the query to fill slots for the query.

In some examples, at block 506, a system as described herein can apply the multi-domain model 220 across a plurality of domains. For example, processor 202 can execute operation engine 218 to apply multi-domain model 220 to domains including an alarm domain, a calendar domain, a communication domain, and a technical domain. Likewise, application to other domains, like sports, is contemplated.

FIG. 6 is a flow diagram that illustrates example processes 600 for training and operating computational models and selecting actions according to various examples described herein.

In some examples, at block 602, a system as described herein can use a joint recurrent neural network (JRNN) to build a multi-domain model for semantic parsing. For example, processor 202 can execute training engine 216 offline and/or operation engine 218 online for queries in order to build a multi-domain model 220, which can be applied to semantically parse later received input.

In some examples, at block 604, a system as described herein can train the multi-domain model. For example, processor 202 can execute training engine 216 offline to train multi-domain model 220.

In some examples, at block 606, a system as described herein can identify a plurality of queries. For example, processor 202 can execute operation engine 218 to semantically parse input from one or more user interface(s), e.g., user interface 130/146, including input devices such as a physical keyboard, a soft keyboard, a touch screen, a touch pad, microphone(s), etc.

In some examples, at block 608 a system as described herein can use the multi-domain model 220 to estimate domain, intent, and slot for a query of the plurality of queries. For example, processor 202 can execute operation engine 218 to apply the multi-domain model 220 to the query in order to identify a domain associated with the query, determine an intent associated with the query, and assign the words of the query to fill slots for the query. The system can incorporate the estimations as part of the intent determination for one or more additional queries.

In some examples, at block 610, a system as described herein can apply the multi-domain model 220 across a plurality of domains. For example, processor 202 can execute operation engine 218 to apply multi-domain model 220 to domains including an alarm domain, a calendar domain, a communication domain, and a technical domain. Likewise, application to other domains, like sports, is contemplated.

EXAMPLE CLAUSES

A system comprising:
one or more processing unit(s);
one or more computer-readable media coupled to one or more of the processing unit(s), the one or more computer readable media having thereon one or more modules of computer-executable instructions to configure a computer to perform operations comprising:
building a multi-domain model using a recurrent neural network (RNN) with semantic parsing from a plurality of queries;
applying the multi-domain model to a query of the plurality of queries; and
operating the multi-domain model across a plurality of domains.

2. A system as clause 1 recites, wherein the multi-domain model comprises a joint recurrent neural network (JRNN).

3. A system as either clause 1 or 2 recites, wherein the individual query of the plurality of queries represents a verbal utterance.

4. A system as any of clauses 1-3 recites, wherein the RNN represents a bi-directional recurrent neural network.

5. A system as any of clauses 1-4 recites, wherein an RNN is activated by long-short term memory (LSTM) and/or GRU from the plurality of queries.

6. A system as any of clauses 1-5 recites, wherein applying the multi-domain model includes:
identifying the query from the plurality of queries; and
estimating a domain, an intent, and a slot for the query of the plurality of queries.

7. A system as any of clauses 1-6 recites, wherein operating the multi-domain model across a plurality of domains includes performing semantic parsing across the plurality of domains.

8. A method comprising:
building a multi-domain model using a recurrent neural network (RNN) with semantic parsing from a plurality of queries;
applying the multi-domain model to a query of the plurality of queries; and
operating the multi-domain model across a plurality of domains.

9. A method as clause 8 recites, wherein the multi-domain model comprises a joint recurrent neural network (JRNN).

10. A method as either clause 8 or 9 recites, wherein the individual query of the plurality of queries represents a verbal utterance.

11. A method as any of clauses 8-10 recites, wherein the RNN represents a bi-directional recurrent neural network.

12. A method as any of clauses 8-11 recites, wherein an RNN is activated by long-short term memory (LSTM) and/or GRU from the plurality of queries.

13. A method as any of clauses 8-12 recites, wherein applying the multi-domain model comprises identifying the query from the plurality of queries.

14. A method as any of clauses 8-13 recites, wherein applying the multi-domain model comprises estimating a domain, an intent, and a slot for the query of the plurality of queries.

15. A method as any of clauses 8-14 recites, wherein operating the multi-domain model across a plurality of domains includes performing semantic parsing across the plurality of domains.

16. A computer-readable medium having encoded thereon computer-executable instructions to, upon execution, configure a computer to perform a method as any of clauses 8-15 recites.

17. A computing device comprising: a computer-readable medium having encoded thereon computer-executable instructions to, upon execution by a processing unit, configure the computing device to perform a method as any of clauses 8-15 recites.

18. A system, comprising:
one or more processing unit(s);
one or more computer-readable media coupled to one or more of the processing unit(s), the one or more computer readable media including:
a multi-domain model comprising a joint recurrent neural network (JRNN) built for semantic parsing;
a training engine configured to generate a trained multi-domain model by training the multi-domain model by:
identifying a plurality of queries; and
estimating a domain, an intent, and a slot for an individual query of the plurality of queries; and
an operation engine configured to operate the trained multi-domain model to perform semantic parsing for the individual query of the plurality of queries across a plurality of domains.

19. A system as clause 18 recites, wherein the RNN represents a bi-directional RNN.

20. A system as either clause 18 or 19 recites, wherein the RNN is activated by long short term memory (LSTM) and/or GRU.

21. A system as any of clauses 17-20 recites, wherein the query comprises an utterance.

22. A system comprising:
means for building a multi-domain model using a recurrent neural network (RNN) with semantic parsing from a plurality of queries;
means for applying the multi-domain model to a query of the plurality of queries; and
means for operating the multi-domain model across a plurality of domains.

23. A system as clause 22 recites, further comprising a means for processing and a means for storing.

24. A system as either clause 22 or 23 recites, wherein the multi-domain model comprises a joint recurrent neural network (JRNN).

25. A system as any of clauses 22-24 recites, wherein the individual query of the plurality of queries represents a verbal utterance.

26. A system as any of clauses 22-25 recites, wherein the RNN represents a bi-directional recurrent neural network.

27. A system as any of clauses 22-26 recites, wherein an RNN is activated by long-short term memory (LSTM) and/or GRU from the plurality of queries.

28. A system as any of clauses 22-27 recites, wherein the means for applying the multi-domain model comprises means for identifying the query from the plurality of queries.

29. A system as any of clauses 22-27 recites, further comprising means for identifying the query from the plurality of queries.

30. A system as any of clauses 22-29 recites, wherein the means for applying the multi-domain model comprises means for estimating a domain, an intent, and a slot for the query of the plurality of queries.

31. A system as any of clauses 22-29 recites, further comprising means for estimating a domain, an intent, and a slot for the query of the plurality of queries.

32. A system as any of clauses 22-31 recites, wherein operating the multi-domain model across a plurality of domains includes performing semantic parsing across the plurality of domains.

33. A system, comprising:
means for processing;
means for storing including:
means for semantic parsing;
means for generating a trained multi-domain model
means for training the multi-domain model:
means for identifying a plurality of queries;
means for estimating a domain, an intent, and a slot for an individual query of the plurality of queries; and
means for operating the trained multi-domain model to perform semantic parsing for the individual query of the plurality of queries across a plurality of domains.

34. A system as clause 33 recites, wherein the means for semantic parsing includes an RNN represents a bi-directional RNN.

35. A system as either clause 33 or 34 recites, wherein the means for semantic parsing represents a bi-directional RNN.

36. A system as any of clauses 33-35 recites, wherein an RNN is activated by long short term memory (LSTM) and/or GRU.

37. A system as any of clauses 33-36 recites, wherein the query comprises an utterance.

CONCLUSION

Various computational-model training and operation techniques described herein can permit more efficiently parsing input, e.g., queries such as utterances, and more readily identify associated domains to determine a corresponding intent while assigning words of the query to appropriate slots. Various examples can provide more effective ongoing training of a single computational model, e.g., based on application across domains, providing improved accuracy with reduced computational power compared to identifying domains and determining intent and filling slots separately per domain.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/202, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system comprising:
one or more processors;
one or more computer storage media coupled to one or more of the processors, the one or more computer storage media having thereon one or more modules of computer-executable instructions to configure the one or more processors to perform operations comprising:
building a multi-domain classifier model configured to jointly model domain, intent, and a sequence of word tags for a natural-language sequence of words, the model comprising a recurrent neural network (RNN) that operates on an input sequence to generate an output sequence, the input sequence comprising a sequence of tokens representing the words of the natural-language sequence followed by an end-of-sequence token, and the output sequence comprising a sequence of word tags associated with respective tokens representing the words of the natural-language sequence followed by a last element comprising a concatenation of domain and intent tags associated with the end-of-sequence token.

2. The system of claim 1, wherein the RNN comprises a bi-directional RNN.

3. The system of claim 1, wherein the RNN comprises at least one of a long-short term memory (LSTM) unit or a gated recurrent unit (GRU).

4. The system of claim 1, wherein the multi-domain classifier model is trained on a plurality of queries paired with respective semantic frames, the plurality of queries being from multiple domains.

5. The system of claim 1, wherein the RNN is configured to operate across a plurality of domains each having associated word tags and associated intents, at least some of the word tags and intents being shared across multiple ones of the plurality of domains.

6. The system of claim 1, the operations further comprising:
applying the multi-domain classifier model to a query to estimate a domain, an intent, and word tags for the query.

7. The system of claim 1, the operations further comprising:
applying the multi-domain classifier model to a plurality of queries across a plurality of domains.

8. A method comprising:
applying a multi-domain classifier model including a recurrent neural network (RNN) with semantic parsing to a plurality of queries across a plurality of domains, the queries each comprising a natural-language sequence of words, the multi-domain classifier model configured to jointly model, for each of the plurality of queries, domain, intent, and a sequence of word tags for the natural-language sequence of words,
wherein applying the multi-domain classifier model to an individual query comprises operating the RNN on an input sequence to generate an output sequence, the input sequence comprising a sequence of tokens representing the words of the natural-language sequence followed by an end-of-sequence token, and the output sequence comprising a sequence of word tags each associated with a respective one of the tokens representing the words of the natural-language sequence followed by a last element comprising a concatenation of domain and intent tags associated with the end-of-sequence token.

9. The method of claim 8, further comprising:
building the multi-domain classifier model.

10. The method of claim 9, wherein building the multi-domain classifier model comprises training the multi-domain classifier model on a plurality of queries paired with respective semantic frames, the plurality of queries being from multiple domains.

11. The method of claim 8, wherein the individual query of the plurality of queries represents a verbal utterance.

12. The method of claim 8, wherein the RNN comprises a bi-directional recurrent neural network.

13. The method of claim 8, wherein the RNN comprises at least one of a long-short term memory (LSTM) unit or a gated recurrent unit (GRU).

14. The method as claim 8 recites, wherein applying the multi-domain model to a plurality of queries across a plurality of domains includes performing semantic parsing across the plurality of domains.

15. One or more computer storage media storing:
a multi-domain classifier model configured to jointly model domain, intent, and a sequence of one or more word tags for a natural-language sequence of words, the model comprising a recurrent neural network (RNN) configured to operate on an input sequence to generate an output sequence, the input sequence comprising a sequence of tokens representing the words of the natural-language sequence followed by an end-of-sequence token, and the output sequence comprising a sequence of word tags associated with respective tokens representing the words of the natural-language sequence followed by a last element comprising a concatenation of domain and intent tags associated with the end-of-sequence token, and
instructions which, when executed by one or more processors, cause the one or more processors to apply the multi-domain classifier model to a query.

16. The one or more computer storage media of claim 15, further storing instructions which, when executed by the one or more processors, cause the one or more processors to train the multi-domain classifier model on a plurality of input sequences of words paired with respective semantic frames including domain, intent, and word tags.

17. The one or more computer storage media of claim 15, wherein the instructions cause the one or more processors to operate the multi-domain classifier model to perform semantic parsing for the query.

18. The one or more computer storage media of claim 15, wherein the instructions cause the one or more processors to operate the multi-domain classifier model to perform semantic parsing for a plurality of queries across multiple domains.

19. The one or more computer storage media of claim 15, wherein the RNN comprises at a bi-directional RNN.

20. The one or more computer storage media of claim 15, wherein the RNN comprises at least one of a long-short term memory unit (LSTM) or a gated recurrent unit (GRU).

* * * * *